United States Patent [19]
Baran
[11] 4,303,869
[45] Dec. 1, 1981

[54] CONTROL CIRCUIT FOR ELECTROMAGNETIC APPARATUS

[75] Inventor: Miroslav Baran, Trenton, Canada
[73] Assignee: Bata Shoe Company, Inc., Belcamp, Md.

[21] Appl. No.: 57,079
[22] Filed: Jul. 12, 1979
[30] Foreign Application Priority Data
Jul. 14, 1978 [CA] Canada ................................. 307385
[51] Int. Cl.[3] ............................................ H02K 33/00
[52] U.S. Cl. ............................... 318/130; 112/121.26; 318/114; 318/129
[58] Field of Search ................... 112/121.26; 318/119, 318/130, 129, 114; 361/155, 156; 310/15, 24, 30, 39, 35

[56] References Cited

U.S. PATENT DOCUMENTS 2,520,537 8/1950 Forman .............................. 318/130
3,361,948 1/1968 Sawyer ............................... 318/130
3,931,554 1/1976 Spentzas .......................... 310/30 X
4,095,536 6/1978 Hujik et al. .................... 112/121.26
4,215,297 7/1980 Jacquemet .......................... 318/130

*Primary Examiner*—Donovan F. Duggan
*Attorney, Agent, or Firm*—Holman & Stern

[57] ABSTRACT

A control circuit for an electromagnetic cutting apparatus includes auxiliary power impulse systems and auxiliary condensers for accelerating an already moving plunger of the cutting apparatus. The basic control circuit includes photoelectric sensors for sensing the leading and trailing edges of components. The sensors are part of an electronic circuit for rapidly charging a coil surrounding a core on the plunger for driving a blade downwardly to cut the tape. Condensers in the electronic circuit are normally charged and, in response to signals from the photoelectric sensors, instantaneously discharge into the coil to actuate the plunger. The auxiliary power impulse systems and auxiliary condensers are controlled by timers for discharging the auxiliary condensers into the coil a short time after the condensers of the basic circuit and while the plunger is moving to accelerate the latter.

3 Claims, 2 Drawing Figures

CONTROL CIRCUIT FOR ELECTROMAGNETIC APPARATUS

BACKGROUND OF THE INVENTION

Field of the Invention

This invention relates to a control circuit for a reciprocating electromagnetic apparatus, and in particular to an electromagnetic cutting apparatus.

The L. Hujik et al U.S. Pat. No. 4,095,536, issued June 20, 1978 discloses an electromagnetic cutting apparatus for cutting binding tape sewn to shoe upper components. The apparatus includes an electromagnetically operated plunger, photoelectric sensors for detecting the leading and trailing edges of the components and an electronic circuit for rapidly charging a coil surrounding a core on the plunger for driving the blade downwardly to cut the tape. Condensers in the electronic circuit are normally charged and, in response to signals from the photoelectric sensors, instantaneously discharge into the coil to actuate the plunger. After cutting the tape, the plunger is returned to the rest or starting position by a helical spring.

While the electronic circuit is effective for causing the blade and plunger to move down quickly against the tape, with thick tapes it is desirable to bring the knife and plunger down with a greater force. It will be appreciated that the ability to move the plunger downwardly with a greater force is useful in any apparatus utilizing a plunger, e.g. for cutting or stamping.

The object of the present invention is to provide a control circuit for reciprocating electromagnetic apparatus which results in relatively rapid downward movement of a plunger, and consequently greater force of impact of the blade or other implement on the bottom end of the plunger.

SUMMARY OF THE INVENTION

Accordingly, the present invention relates to a control circuit for use in a reciprocating electromagnetic apparatus of the tupe including a plunger, a core on plunger and a coil surrounding the core for driving the plunger, the control circuit comprising at least one normally charged primary condensed means connected to said coil for energizing the coil; means for instantaneously discharging said primary condenser means into said coil; at least one normally charged auxiliary condenser means connected to said coil for energizing the coil; and timer means connected to said auxiliary condenser means for causing said auxiliary condenser means to discharge into said coil after said primary condenser means.

Because there is a delay between discharging of the primary and auxiliary condensers, after the plunger has started moving downwardly the auxiliary condenser is discharged to accelerate the already moving plunger. Of course, it is preferable to be able to adjust the delay between condenser discharge so that maximum plunger acceleration can be achieved.

DESCRIPTION OF THE PREFERRED EMBODIMENT

Figure 1:
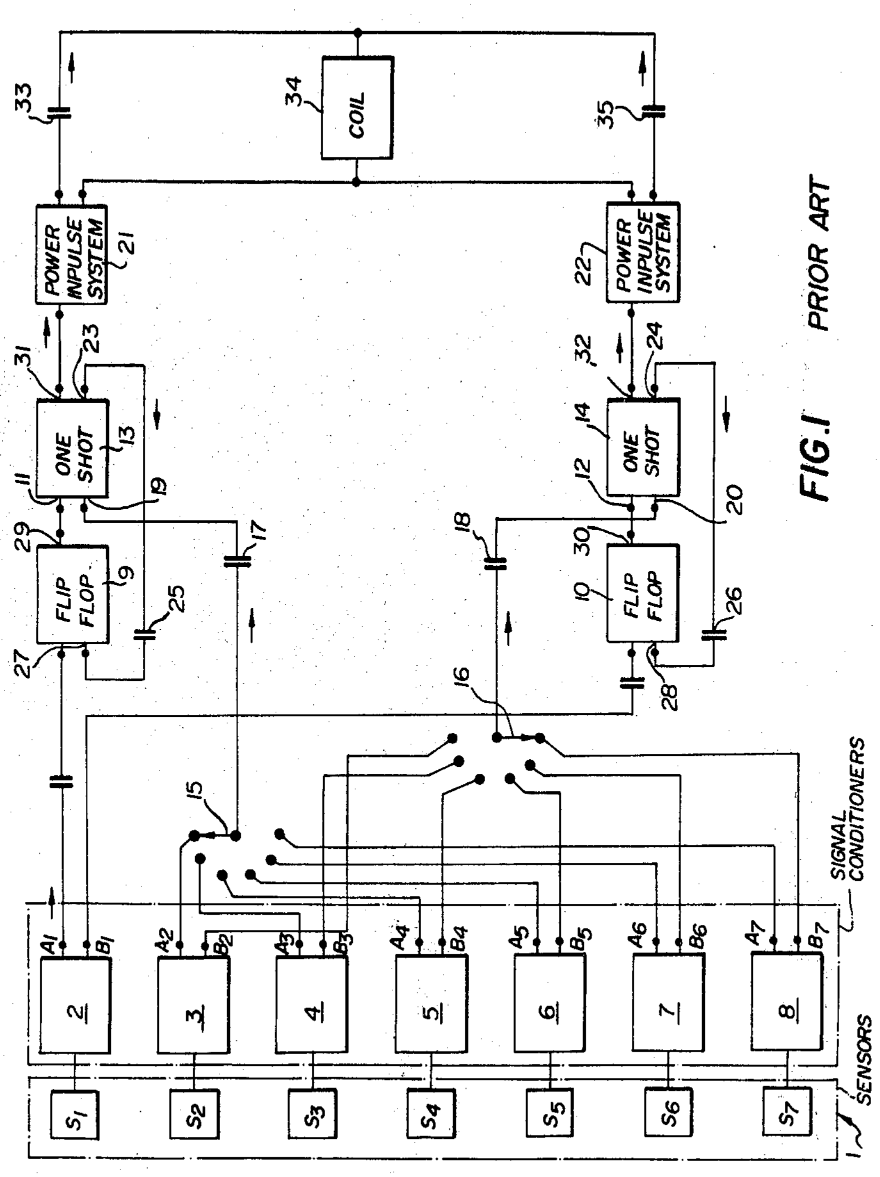
FIG.1 PRIOR ART
FIG. 1 is a block diagram of a prior art control circuit.

With reference to FIG. 1, applicant's earlier control circuit is employed to control a cutting device for cutting a strip of tape at the leading and trailing edges of shoe components. The leading and trailing edges of the components are detected by sensors generally indicated at 1, i.e. the components travel over seven photo sensors $S_1$ to $S_7$. The functions of the photo sensors $S_1$ to $S_7$ are selected by switches, so that the cutting device is activated at the moment when the front or back edge of a component is beneath the blade. The leading and trailing edges of the shoe components cover or uncover the sensors $S_1$ to $S_7$ in succession.

Changes in illumination of the photo sensors are registered by signal conditioners 2 to 8. The outputs $A_1$ to $A_7$ and $B_1$ to $B_7$ of the signal conditioners change from logic level "0" to "1" and from "1" to "0" each time a change in illumination occurs. The sensor $S_1$ with the signal conditioner 2 sets two flip-flops 9 and 10 to open inputs 11 and 12 of monostable multivibrators or so-called one shots 13 and 14. The photocells $S_2$ to $S_7$ in conjunction with signal conditioners 3 to 8 trigger the one shots 13 and 14 via switches 15 and 16, capacitors 17 and 18, and inputs 19 and 20.

The one shots 13 and 14 generate trigger signals for power impulse systems 21 and 22, and, at the same time, reset both flip-flops 9 and 10 via outputs 23, 24, capacitors 25, 26 and inputs 27, 28. Signals from the signal conditioner outputs $A_2$ to $A_7$ control the first cutting action, i.e. the cut at the leading edge of each of the components and signals from outputs $B_2$ to $B_7$ control the second cut at the trailing edge of the components. The selection of which of the photo sensors $S_2$ to $S_7$ are to control the first and second cuts is made by means of the switches 15 and 16.

Every time power is applied to the foregoing system, both flip-flops 9 and 10 are automatically pre-set, so that their outputs 29, 30 have logic "0" level. Thus, both one shots 13 and 14 are closed, and accidental signals fed to inputs 19 and 20 from sensors $S_2$ to $S_7$ cannot start the one shots. When the sensor $S_1$ is blanked or occluded, the $A_1$ output of the signal conditioner 2 will go to the state "0" where its output $B_1$ is at a logic "1" level. Thus, the first one shot 13 is open and ready to make a trigger for the first cut.

Assuming that the sensor $S_2$ is selected as the first cut sensor, and the sensor $S_7$ is selected as the last cut sensor, the switch 15 will be switched to output $A_2$ of the signal conditioner 3 and the switch 16 will be switched to the output $B_7$ of the signal conditioner 8.

If the leading edge of the sewn components occlude the sensor $S_2$, the output $A_2$ of the signal conditioner 3 will become a "0", and consequently the first one shot 13 will generate a trigger pulse on both outputs 31 and 23. The pulse from output 31 will trigger the power impulse system 21, which discharges a condenser 33 into coil 34 of the cutting device, and the cutting device will make a first cut at the leading edge of the components. At the same time, the pulse from the output 23 resets the first flip-flop 9, and the first one shot 13 is again closed.

When the trailing edge of the components uncovers the sensor $S_1$, the output $B_1$ of the signal conditioner 2 becomes a "0" level, and the output 30 of the second flip-flop 10 is changes from "0" to "1" to open the second one shot 14. As soon as the sensor $S_7$ is uncovered and illuminated, output $B_7$ of the signal conditioner 8 becomes a "0", and thus the second one shot 14 generates a trigger pulse for the second cut. The pulse from the output 32 triggers the power impulse system 22, which discharges condenser 35 into the coil 34 to make the second cut at the trailing edge of the shoe components. At the same time, the pulse from output 24 resets the second flip-flop 10, and the second one shot 14 is closed. The control system is then ready for the next cycle.

Figure 2:
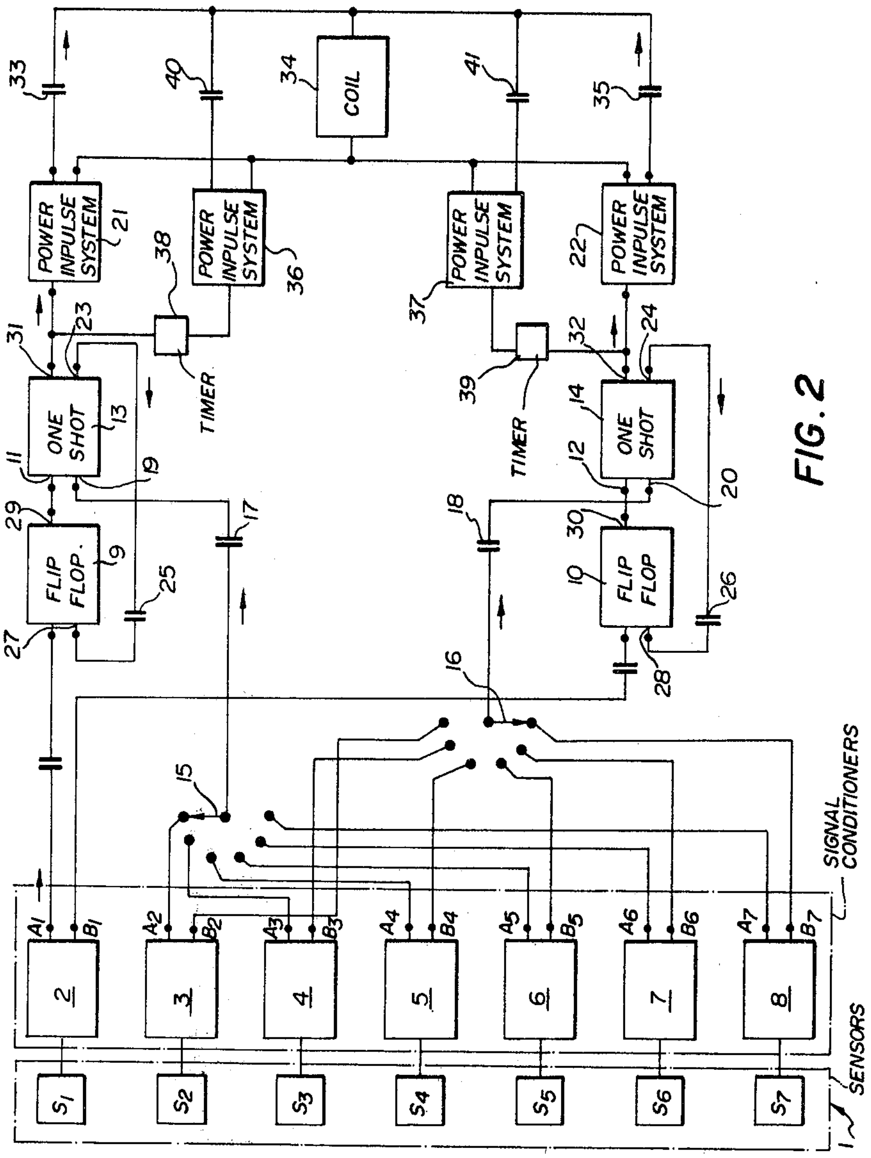
FIG. 2 is a block diagram of a control circuit in accordance with the present invention.

In the description of FIG. 2 which follows, the same reference numerals have been used to identify elements the same as those in FIG. 1.

The control circuit of the present invention includes the same elements as the circuit of FIG. 1 and additional elements, namely auxiliary power impulse systems 36 and 37, timers 38 and 39, and condensers 40 and 41.

Just as the power impulse systems 21 and 22 are triggered by signals from the one shots 13 and 14, the auxiliary power impulse systems 36 and 37 are also triggered by the one shots 13 and 14 via the timers 38 and 39. By making an appropriate setting of the timers 38 and 39, the auxiliary power impulse systems 36 and 37 can be triggered shortly after the systems 21 and 22.

Starting from when the first one shot is open and ready to trigger the first cut, assuming that the sensor $S_2$ is selected as the first cut sensor, and the sensor $S_7$ is selected as the last cut sensor, the switch 15 will be switched to output $A_2$ of the signal conditioner 3 and the switch 16 will be switched to the output $B_7$ of the signal conditioner 8.

When the leading edge of the sewn components occlude the sensor $S_2$, the output $A_2$ of the signal conditioner 3 will become "0", and consequently the first one shot 13 generates a trigger pulse on both outputs 31 and 32. The pulse from output 31 triggers the power impulse system 21, which discharges the condenser 33 into the coil 34 of the cutting device. After a short delay, the same pulse from output 31 triggers the auxiliary power impulse system 36 via the timer 38 which discharges the condenser 40 into the coil 34 to accelerate the already downwardly moving plunger of the cutting device, which makes a first cut at the leading edge of the components.

The same sequence occurs when the sensor $S_7$ is uncovered and illuminated. The pulse from the output 32 triggers the power impulse system 22, which discharges the condenser 35 into the coil 34 and, after a short delay the same pulse triggers the auxiliary power impulse system 37 via the timer 39 to discharge the condenser 41 into the coil 34, accelerating the already downwardly moving plunger of the cutting device. A second cut at the trailing edge of the shoe components is thus made, and at the same time the pulse from the output 24 resets the second flip-flop 10 and the second one shot is closed. The closed system is then ready for the next cycle.

There has thus been described a control circuit for use with a reciprocating electromagnetic apparatus of the type including a plunger, the control circuit providing for acceleration of the plunger after movement thereof has been initialed.

I claim:

1. A control circuit for use in a reciprocating electromagnetic apparatus of the type including a plunger, a core on the plunger and a coil surrounding the core for driving the plunger, the control circuit comprising at least one normally charged primary condenser means connected to said coil for energizing the coil; means for instantaneously discharging said primary condenser means into said coil; at least one normally charged auxiliary condenser means connected to said coil for energizing the coil; and timer means connected to said discharging means and to said auxiliary condenser means for causing said auxiliary condenser means to discharge into said coil after said primary condenser means.

2. A control circuit according to claim 1, including a pair of normally charged primary condenser means; and a pair of auxiliary condenser means, said discharging means causing one of said primary condenser means and an associated one of said auxiliary condenser means to discharge into said coil.

3. A control circuit according to claim 2, including a separate power impulse system for each said primary and auxiliary condenser means.

* * * * *